(12) United States Patent
Kady et al.

(10) Patent No.: US 6,469,615 B1
(45) Date of Patent: Oct. 22, 2002

(54) LOCKING DEVICE FOR TOOLS AND EQUIPMENT

(76) Inventors: Darren J. Kady, 5111 Stony Point Rd., Barboursville, VA (US) 22933; Deborah A. Kady, 5111 Stony Point Rd., Barboursville, VA (US) 22933

( * ) Notice: Subject to any disclaimer, the term of this patent is extended or adjusted under 35 U.S.C. 154(b) by 0 days.

(21) Appl. No.: 09/178,837

(22) Filed: Oct. 26, 1998

Related U.S. Application Data
(60) Provisional application No. 60/065,941, filed on Oct. 27, 1997.

(51) Int. Cl.$^7$ ................................................ G05B 19/00
(52) U.S. Cl. .................. 340/5.1; 340/5.42; 340/3.5; 340/309.15; 340/825.56; 340/825.72
(58) Field of Search ............................. 340/825.31, 5.42, 340/825.56, 309.15, 3.5, 825.69, 5.1

(56) References Cited

U.S. PATENT DOCUMENTS

| | | | |
|---|---|---|---|
| 4,967,305 A | | 10/1990 | Murrer |
| 5,231,310 A | * | 7/1993 | Oh .............................. 307/142 |
| 5,510,780 A | * | 4/1996 | Norris et al. ............... 340/5.42 |
| 5,563,586 A | * | 10/1996 | Baum et al. .................. 340/3.5 |
| 5,600,723 A | | 2/1997 | Woodall et al. ............... 380/23 |
| 6,005,489 A | * | 12/1999 | Siegle et al. ........... 340/825.69 |

* cited by examiner

Primary Examiner—Brian Zimmerman
Assistant Examiner—Yves Dalencourt
(74) Attorney, Agent, or Firm—Sheldon H. Parker

(57) ABSTRACT

The operating control device can be use on equipment such as hand tools, electronics or fuel pumps. An input device enables the input of user access codes and a readout panel monitors the equipment status. A control member is in communication with the input device, readout panel, power source, driver member and activation member to prevent operation of the equipment by requiring entry of a user code. The control device can include a programmable timer to communicate with the control member to enable the power to flow from the power source to the driver member for a predetermined period of time. A clock can track time and activate and deactivate the timer. The communication can be through electrical wires that can be encased in a solid material to make the control member and wires inaccessible. When used directly on a fuel pump, the control member prevents fuel from reaching the engine without the input of a proper user code. Alternatively, the control device can be a fuel line shutoff valve to prevent fuel from traveling along the line. A solenoid can be used in the shutoff valve to prevent flow of fuel from the gas tank to the driver. A locking driver for use on bicycles interacts with the axle connecting the peddles. A engagement disk, having multiple ports along its circumference, is unmovably affixed to the axle. A locking bar activation member engages and disengages a locking bar with the engagement disk to prevent rotation of the axle.

12 Claims, 12 Drawing Sheets

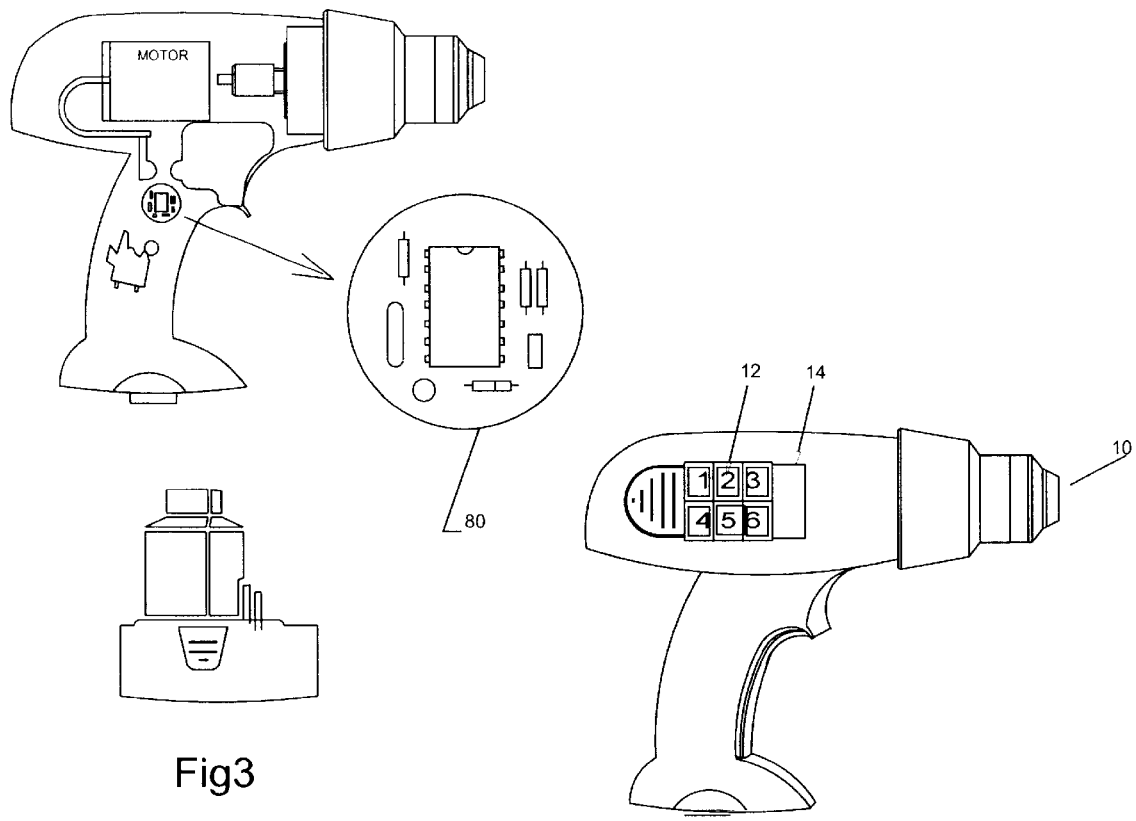
Fig3
Fig1
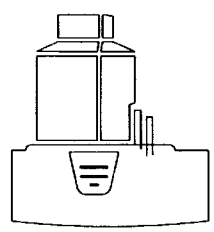
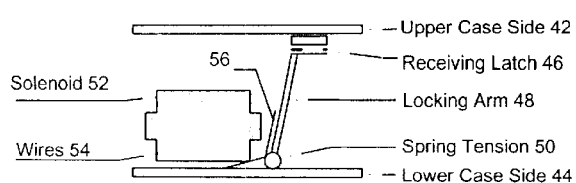
Fig2

LOCKING DEVICE FOR TOOLS AND EQUIPMENT

This application claims benefit of provisional application Ser. No. 60/065,941 filed Oct. 27, 1997.

BACKGROUND OF THE INVENTION

1. Field of the Invention

The device relates to a safety device that, once activated, allows the equipment to run for a preprogrammed period of time. In some embodiments the device is used as a antitheft device without use of the timing mode. The use of an activation code prevents theft and resale of protected equipment.

2. Brief Description of the Prior Art

Tools offer a temptation to thieves as they are easy to resell due to lack of distinctive features. Further, few people mark their tools as faithfully as they would their stereo equipment. Even tools that have been marked can be sold to an unknowing purchaser prior to police reports being issued and few individuals check for stolen merchandise. The problem also arises in construction companies that tools are stolen from a job site, leading to costly replacements.

SUMMARY OF THE INVENTION

A locking device is disclosed for use on tools, electronic and mechanical equipment, heavy equipment and machinery, gas-powered vehicles and various other wheeled vehicles. The device provides the option of permitting the equipment to be operated for a predetermined period of time.

Electronic circuitry within the device, in conjunction with an unlocking and optional timer operation, requires that the equipment be unlocked prior to use. A time period for operation can be programmed into the equipment, after which time the unit shuts off. This reduces theft as well as preventing unauthorized use of the item.

The operating control device is for use with equipment having an exterior case, a power source, an activation member and a driver member. The control device has an input device to enable the input of user access codes and a readout panel to monitor the status of the equipment. A control member is in communication with the input device, readout panel, power source, driver member and activation member. The control member prevents operation of the equipment by preventing the transfer of power from the power source to the driver member without the entry of a user code. Entry of the user code enables the power to flow from the power source to the activation member to the driver member, thereby activating the equipment. The control device can further include a programmable timer to communicate with the control member thereby enabling the power flow from the power source to the driver member for the predetermined period of time entered at the input device. A clock member can track time and activate and deactivate the timer based on user input. The communication between the control member and the input device, readout panel, power source, driver member and activation member can be through electrical wires that can be encased in a solid material to make the control member and wires inaccessible. The locking device can be used on equipment such as hand tools, electronics or fuel pumps.

When used directly on a fuel pump, the control member prevents the fuel pump from enabling fuel to flow from the gas tank to the engine without the input of a proper user code. Alternatively, the control device can be a fuel line shutoff valve to prevent fuel from traveling along the line. A solenoid can be used in the shutoff valve to prevent flow of fuel from the gas tank to the driver. In one embodiment, a solenoid is used to enable fuel to flow from the fuel tank, or power source, to the activation member, or engine.

A locking device, encompassed by an exterior case, for use on bicycles interacts with the axle connecting the peddles. A engagement disk, having multiple ports along its circumference, is unmoveably affixed to the axle causing the disk to rotate with the axle. A locking bar, positioned within a brace affixed to the exterior case, engages one of the ports in the engagement disk to prevent rotation of the axle. A locking bar activation member engages and disengages the locking bar with the engagement disk. The locking device can be a manually operated lock, a solenoid having a power source and being activated by an input member. A resetable timer can display the lapsed time on a display panel. A removable access panel permits the user to access the exterior case and locking bar.

BRIEF DESCRIPTION OF THE DRAWINGS

The advantages of the instant disclosure will become more apparent when read with the specification and the drawings, wherein:

FIG. 1 is a side view of an example hand tool incorporating the locking device;

FIG. 2 is a cutaway view of the interior of the locking arm and solenoid of the instant invention;

FIG. 3 is a top view of an example controller configuration;

DETAILED DESCRIPTION OF THE INVENTION

Figure 4:
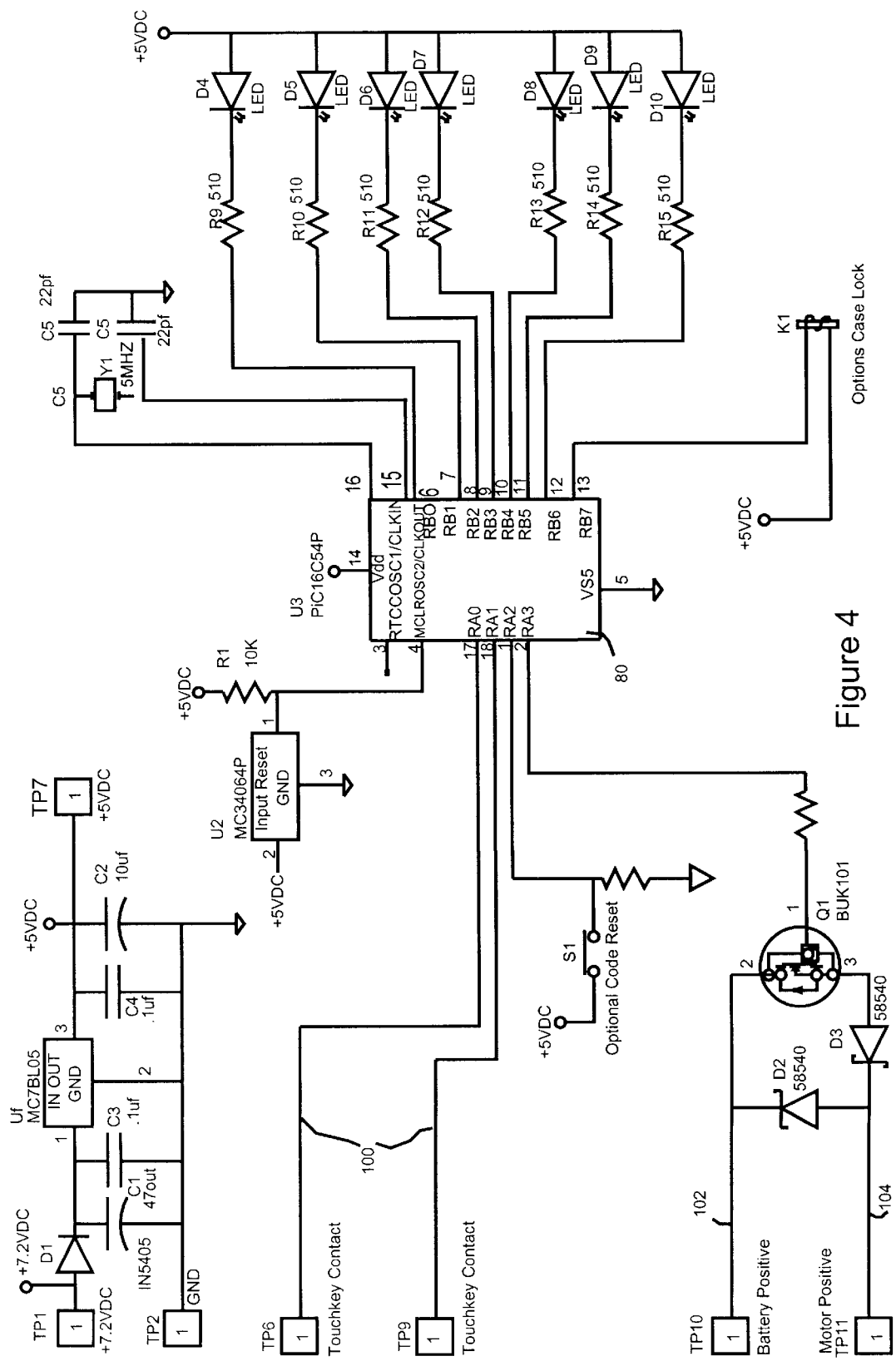
FIG. 4 is the schematic of an example wiring for the locking device for use with a hand tool.

The disclosed invention relates to a coded locking mechanism that discourages theft. In addition to the inherent advantages obtained through the locking device as disclosed, further safety advantages are achieved simply by its existence. It will be obvious to anyone who buys an item containing the locking device that unless the seller has the code, the item is most likely stolen. Most theft of portable items, such as tools, bicycles and electronics, is related to resale of the item. Generally, this resale is through pawn shops, or individuals, who have no way of tracing ownership of the item. The disclosed locking device controls the activation of the item, preventing activation without the entry of user codes. Without access to the codes, the item is useless and unsaleable.

Bicycles have been, to date, difficult to protect against theft. The standard means for securing a bicycle is to chain the frame to a non-movable object. The thief, however, can simply cut the chain and ride the bike away. The disclosed device locks the peddles, thereby preventing the bike from being ridden and requiring a thief to pick the bicycle up and carry it off. The addition of an alarm will further deter the theft of the bike. Except in secluded areas, this would cause far more attention than most thieves are willing to risk. The incorporation of the disclosed device installed on a bicycle is discussed in detail further herein.

Gas and diesel powered vehicles, whether automobiles or forklifts, are always in danger of being stolen. Various alarm systems have come out for automobiles, however few have been successful in preventing "hot wiring". The disclosed device attaches to either the fuel line or fuel pump, to prevent fuel from reaching the engine.

The locking mechanism can be of a type that does not require the use of a key, or other device, thereby avoiding an additional item to lose or carry. Alternatively, other locking means can be used, such as magnetic card readers, standard keys, telephone signals, infrared code or radio frequency transmitters and receivers, etc. Iris scans, finger printing or other means for registering a user currently known in the art can be incorporated where applicable to the equipment. The touch key scanning technology can easily be incorporated into the device, thereby permitting data relating to the item to be tracked. The scanning technology provides benefits in a laboratory or other setting where equipment is centralized and removed for use. Each employee would have a personalized touch key that records the employee name, time of removal, etc. The disclosed device is easily incorporated into electronic devices, such as televisions, cameras, VCRs, stereo equipment, computers, camcorders, etc. at the time of manufacture. Alternatively the device can be retrofitted into the power source, such as the power cord or plug. The use of microchips, or analog, technology permits various functions to be monitored, such as scheduling service, based on use time or the number of hours an item has been used.

When installed on a computer, the disclosed device can be connected directly to the power supply permitting businesses that sell computer time to automatically enter the sleep mode, shut down or otherwise place the computer in an non-active status, unless additional time is purchased. In home use, the device permits parental control on the amount of time, or specific time periods, the computer, or other electronic device such as a TV, can be used by a child. Thus, the computer, VCR or TV could only be activated after homework is completed, etc. The device can be easily modified to either shut down the equipment completely or, as in the case of computers, place the device in the "sleep" or inoperative mode. Computers are especially adaptable to keyboard programming of the device, although a keyboard interface can be included with any of the locking devices disclosed. A program embedded in the device's microchip can allow for a simple timer setting that is activated through key input on the keyboard. As an option, a direct coding key can be incorporated on the keyboard that automatically accesses the program and permits activation, setting changes, etc. Although computer lock out programs are known in the prior art, they totally lock out use of the computer. The disclosed device permits access to the computer for a predetermined period of time either at random or within a specific schedule time period. A warning light is preferably incorporated to permit the user to save data prior to placing the computer in the inactive mode. The user entering the time restraints would set up the program with a user code to prevent unauthorized changes to the program.

The disclosed locking device is also advantageous for rental equipment, such as generators, compressors, VCR's, etc., in that the rented equipment can be programmed for a specific period of time and after that point be automatically deactivated. This discourages the theft of rental equipment, thereby reducing insurance and liability, since by preventing unauthorized use, especially when used in conjunction with larger equipment, insurance rates would potentially be reduced.

In electronic equipment, such as TVs, VCRs, etc. containing infra red remote controllers, the timing activation device can be activated through the remote controller. Once activated the program would appear on the screen and utilize either existing or specific keys to set the shut down time, user time periods, etc. This would be an inexpensive addition to a controller and increase user convenience. Alternatively the controller itself can be used to set the time of use, without the appearance of the setting program on the screen.

It should be noted that the use of analogue, key scanners, infra red, etc. taught herein for use by a specific embodiment, is not limited to that embodiment. Each embodiment of the locking device disclosed herein can incorporate the electronics, memory, etc. as described herein in relation to any other embodiment.

A hand drill, as illustrated in FIGS. 1 and 2, is used to illustrate the disclosed mechanism used to limit user time, however this is an example only and is not intended to limit the invention. In order to facilitate the description of the embodiments herein, the recipient of the power received will be referred to herein as the driver. The power tool 10 is illustrated in FIG. 1 ready for use, incorporating a numeric keypad 12 as the locking mechanism. Other activating mechanisms will be apparent to those skilled in the art when read in conjunction with the disclosure. As stated heretofore, in many applications advantages are provided by not having an additional device to activate the tool. However, in some residential and commercial applications, the separate activation device can be desirable. It is preferable when using this embodiment to protect devices owned by the user, that the use be on a timed basis rather than an on-off basis. Forgetting to the turn off access to the device would negate the advantages to the disclosed locking device. This is overcome by incorporating a timer that deactivates the equipment after a preset period of non-use, requiring reactivation through the appropriate method. The lapsed period of time can be factory set or programmed in by the user.

The time can be set through any means appropriate to the equipment being used as well as the final use. For example, the time can be through repeatedly touching a specific key, jumping the time by predetermined increments. Alternatively, an "enter" key can be provided which allows entry of the unlocking code and subsequent entry of a predetermined period of time. Preferably all timed locking devices are provided with nonvolatile memory to prevent the loss of programmed instructions in the event the item's battery goes dead or is removed. This is more critical with rechargeable hand tools where completely discharging the battery is sometimes required to fully recharge. On larger items, such as construction equipment or generators, a cellular dial in can be included to allow the addition of time to be accomplished remotely from the owner's location. A microphone can be added to the locking device to receive, and register, a code consisting of telephone touch tones to extend the operation time. Various other methods can also be used, and these methods will be evident to those skilled in the art.

The locking code can be factory set and the code numbers provided at time of purchase. Alternatively, the locking code can be reprogrammable either by the user or by a factory representative. The reprogrammable feature enables the code to be changed when required, such as sale of the tool. The device can be capable of being reprogrammed more than one time, however, the number of reprogrammings allowed, and the party performing the reprogramming, all affects the security of the device. For maximum security, while still allowing reprogramming, the device is provided with only one or two opportunities to reprogram the code and the reprogramming would be completed at a service center. In the optimum configuration, other readings are also provided that would be critical to the operation of the device. The incorporation of a microchip to register the locking codes and program the activation time further provides the added ability to monitor various other tool functions. For example, an LED display 14 of FIG. 1 can be included which indicates the activation time remaining and, if desired, the current status of the tool. The status can include, for example, current battery power (both during recharge and discharge), pressure remaining when air tools are used, rpm and direction of drills, etc. This is of optimum use in monitoring the status of rechargeable batteries. Since many rechargeable batteries do not either fully charge unless fully discharged prior to recharging, the battery monitoring device permits optimum use and management of the battery. It should also be noted that an LED could be provided on the recharging device to monitor the battery recharge thereby serving as a double check to the LED on the device being charged.

In FIG. 2 one design of the internal activation unit 40 is illustrated. The locking arm 48 is supported between the upper case side 42 and the lower case side 44. The spring tension 50 is designed to place the solenoid contact 56 in physical contact with the solenoid 52 when the locking arm 48 is pulled back during use. Once the locking arm 48 is released, the solenoid contact 56 is removed from contact with the solenoid 52. The solenoid 52 receives power from the battery 108 (FIG. 5) through the controller 80, an example of which is illustrated in more detail in FIG. 3. As can be seen from the example schematic of FIG. 4, the controller 80 serves as the central processing area, with all input and output passing through the controller 80. The controller 80 is connected directly to the locking mechanism, such as a numeric keypad 12, through the keypad wiring 100. The battery wiring 102 and motor wiring 104 also feed into the controller 80. Once the locking means, such as numeric keypad 12, is activated, all connections are made and power is free to go to the driver specific to the power tool 10. The exact schematic of the wiring is not critical, as the criticality lies with in the interaction between the locking means and the controller 80. The interior of the hand tool 10, as shown in FIG. 5, is traditionally spaced, with the controller 80 located within the handle area. In this embodiment, the various connecting wires 100, 102 and 104 are exposed and, in the event of theft, the case can be opened and the wires cut and crossed to bypass the controller 80. In order to prevent a thief from opening the case and by passing the controller 80, the case is provided with a safety lock key having a number of different embodiments. One embodiment is to incorporate a locking member, wired to the controller through the locking wire 156, that is deactivated by a locking code, key or other compatible methods. The controller 80 can be programmed to allow the case to release, for example through a separate code being entered or by holding down the last number of the existing code for a predetermined time period. A separate code is preferable in that it prevents any unauthorized access to the interior of the case. For maximum security, the safety lock key would be available only to certified dealers and service companies for the specific brand or obtained directly from the dealer by mail, etc. By providing the safety lock key, if the tool was stolen and tampered with for sale or pawn, the by-pass would be apparent due to the broken casing.

Figure 6:
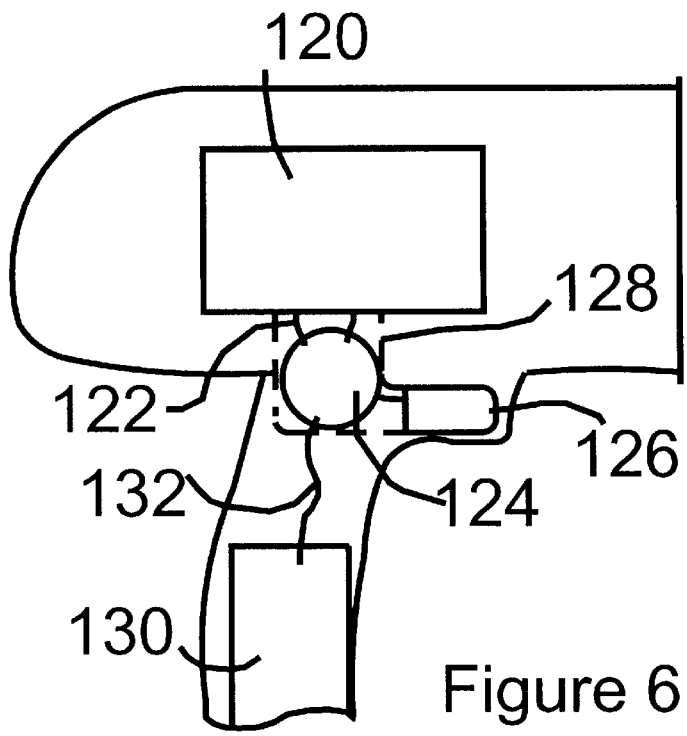
FIG. 6 is a cutaway side view of an alternate embodiment of a hand tool utilizing the disclosed locking device.

In an alternative embodiment to the safety lock key, the solenoid 126 and wiring 122 are encased in an epoxy, indicated herein as region 128, as illustrated in FIG. 6. By encasing the wiring 122 within the epoxy, it is impossible to rewire the unit and bypass the controller 124. Other materials, known in the art, can be used to replace the epoxy. To facilitate the placement of the epoxy region 128, the wiring 122 from the motor 120 exits the motor casing proximate the controller 124, which has been placed as close as possible to the solenoid 126. This revised placement reduces the area to be protected, thereby reducing material and labor costs. Revising the placement of the battery 130 is difficult, preventing in some instances the battery wiring 132 from being covered. However, with the controller 124 and solenoid 126 both encased in epoxy, there would be no value to cutting the battery wire 132, as there would not be any accessible power connections.

Figure 7:
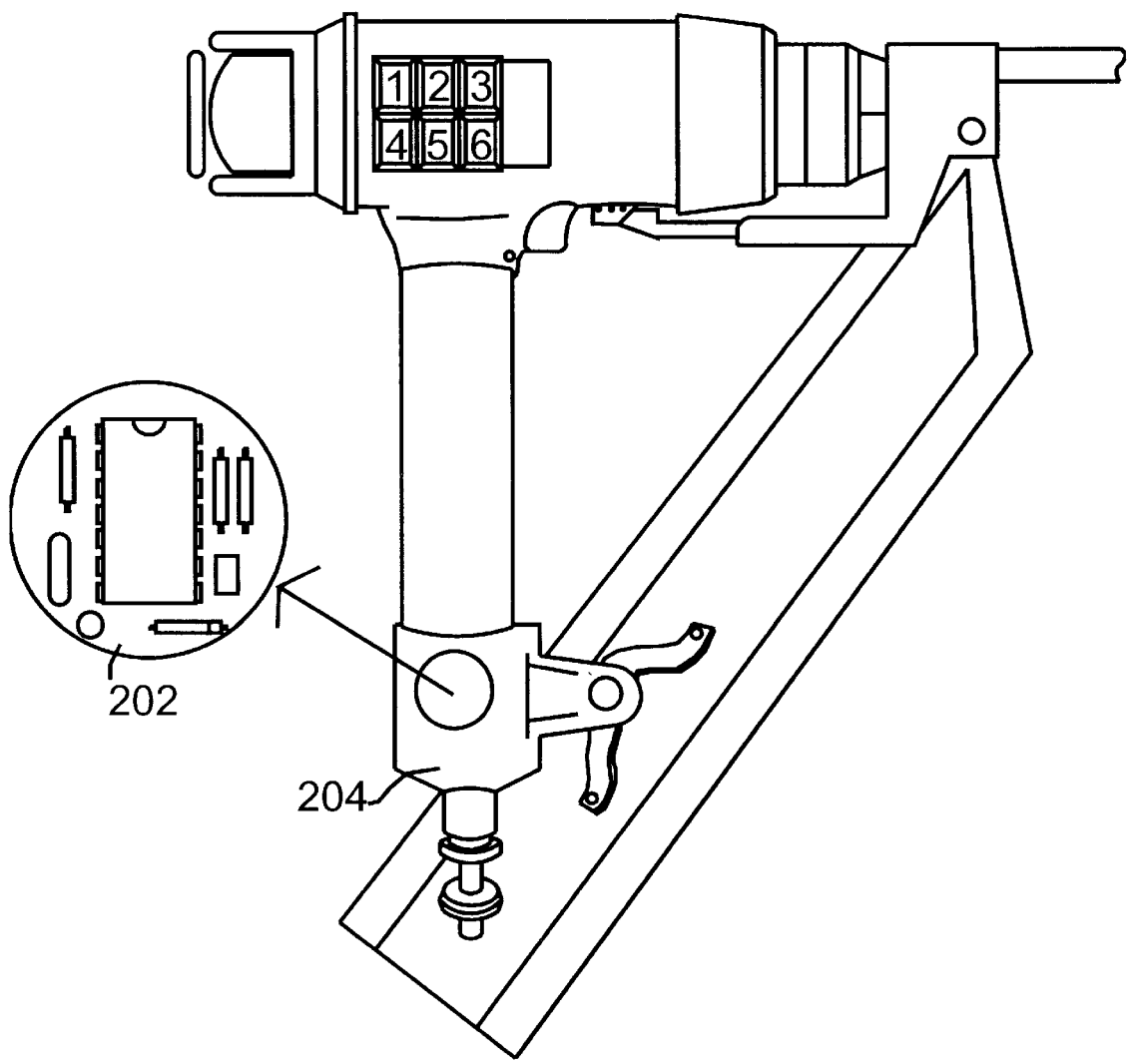
FIG. 7 is a side view of the instant device for use with a air tool system.
Figure 8:
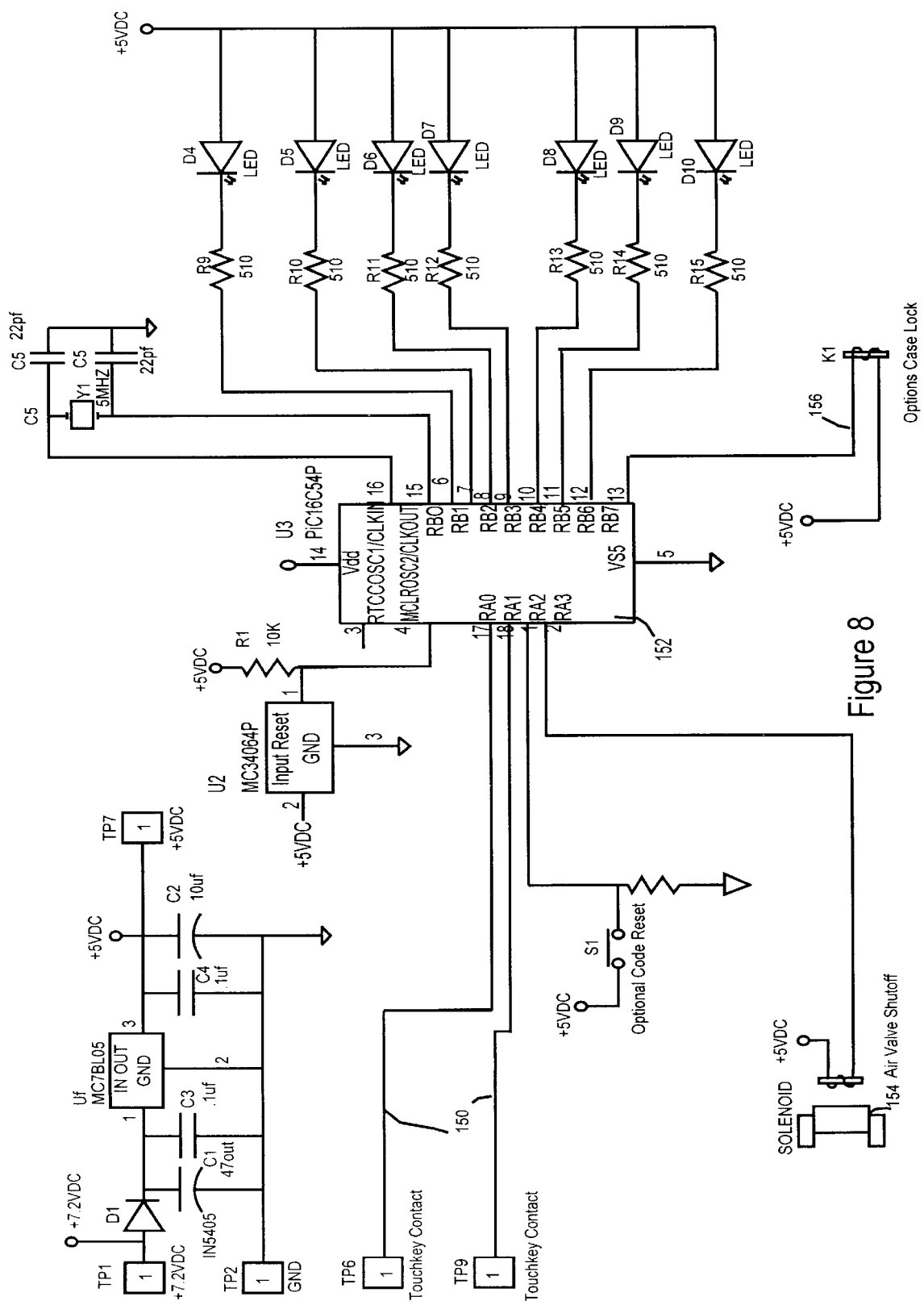
FIG. 8 is a schematic of the wiring for use with the locking device used in conjunction with air tools.

In FIG. 7, the locking device is illustrated being used with an air tool 200, although it should be noted that the device can also be used with propane, gas, and diesel tools and equipment. This embodiment is additionally applicable for use with electric tools and equipment having a power cord. The controller unit 202, as illustrated, is located in the handle 204 of the air tool. Due to the spread out nature of the air tools, the use of a safety key lock is, in some instances, more practical than redesigning the interior of the unit to allow the wiring to be embedded in epoxy. This is a choice of the manufacturer based on cost, specific tool, etc. As can be seen in the example schematics of FIG. 4 (battery) and FIG. 8 (air tool) there is little difference in wiring between the two. As stated, in the schematic of FIG. 4 the touch key wiring 100 goes to the controller 80, as does the battery wire 102 and the motor wire 104. In the air tool, or other removed power source, the touch key wiring 150 and solenoid 154 wiring feed into the controller 152 and onto the driver, the battery and motor connections being eliminated.

Figure 15:
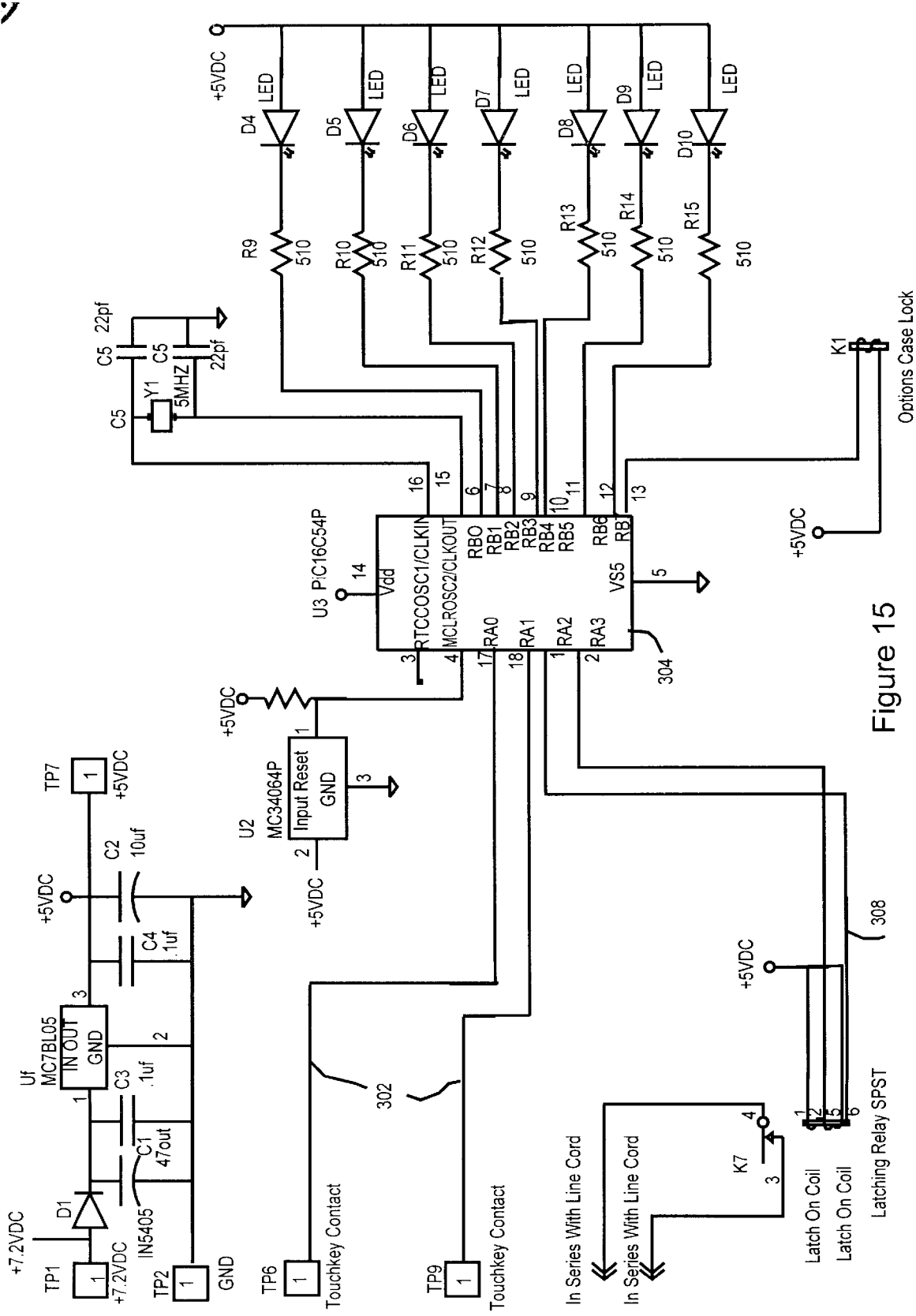
FIG. 15 is a schematic of the wiring for use with electronic devices.
Figure 16:
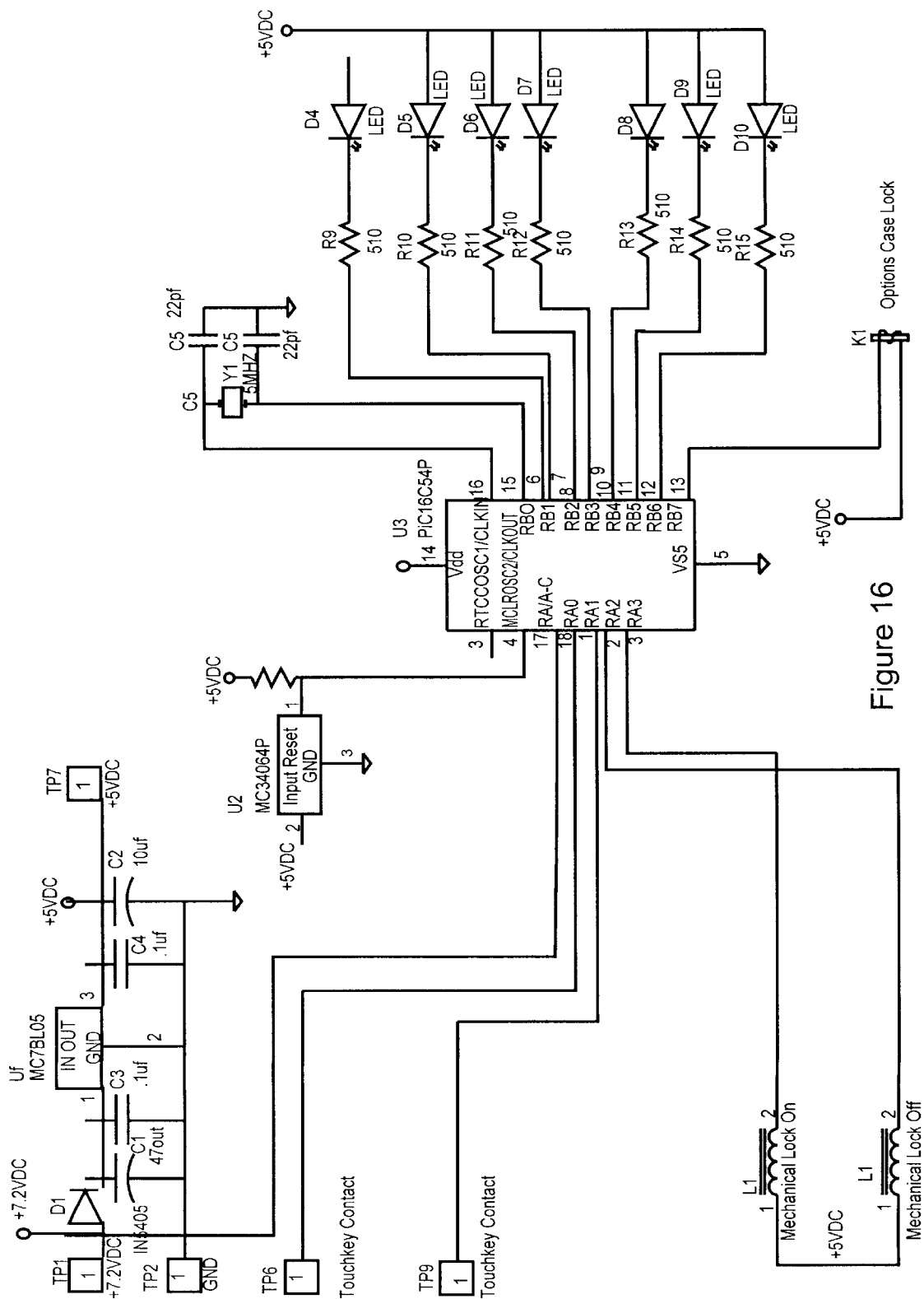
FIG. 16 is a schematic of the wiring for use with the locking device incorporating the analogue function.
Figure 17:
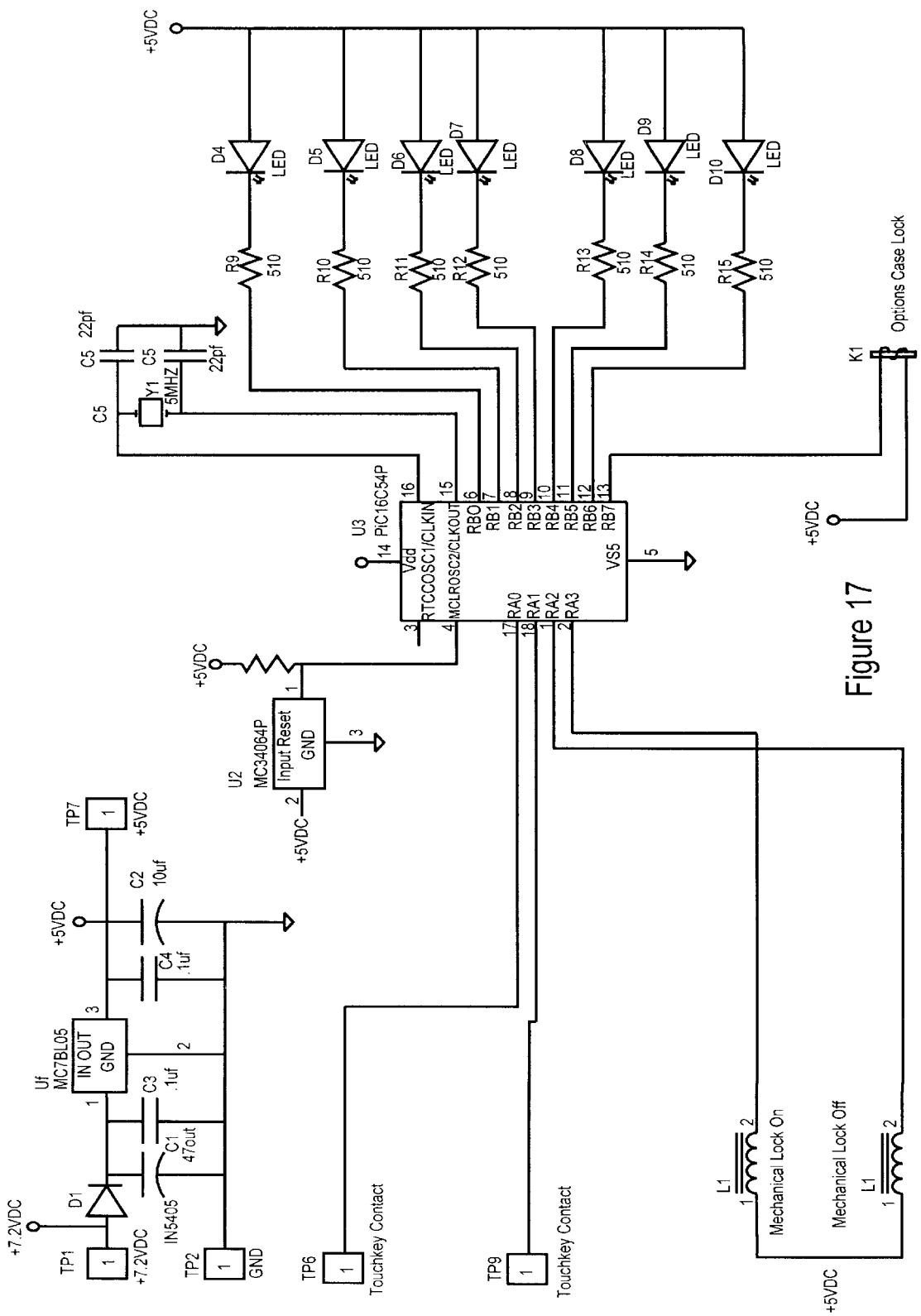
FIG. 17 is a schematic of the wiring for use with the locking device on mechanical apparatus, such as bicycles.

As stated heretofore, the disclosed device can be easily incorporated with electronic equipment. The schematic of FIG. 15 is an example of the electronics for a device being incorporated into a computer, VCR, television, etc. As can be seen, the basic functioning of the antitheft device is the same as used for a battery or air tool. As in the schematics disclosed heretofore, the touch key wiring 302 feeds into the controller 304. In this embodiment, however, the electric wiring 306 is connected to the controller 304 through the latching relay wires 308. The schematic of FIG. 16 provides an example of the electronic layout, disclosed in FIG. 15, to incorporate the analogue function into the device through analog wiring 350.

One use of the disclosed invention is in commercial industries with workers using company owned tools and equipment. The tools are activated in the morning to run for an entire shift, at which point they shut down. This prevents theft from outside sources as well as employees. Additionally by reactivating the tools each morning, a "safety check" can be incorporated with the activation to prevent faulty equipment from being used.

The locking device can further be used with bicycles, shopping carts, wheelchairs, etc. It should be noted, however, that since the locking devices disclosed herein operate on bicycles by stopping movement of the pedals, this device is not recommended for bikes, or other items that have foot brakes. In the event, that the device was activated during use, the user would be unable to activate the brakes. The example used herein is a bicycle, however the device, as disclosed, can easily be adapted for a variety of other wheeled devices. The locking device for use with bicycles, or other applicable devices, preferably has a weight of about one (1) pound or less.

Figure 9:
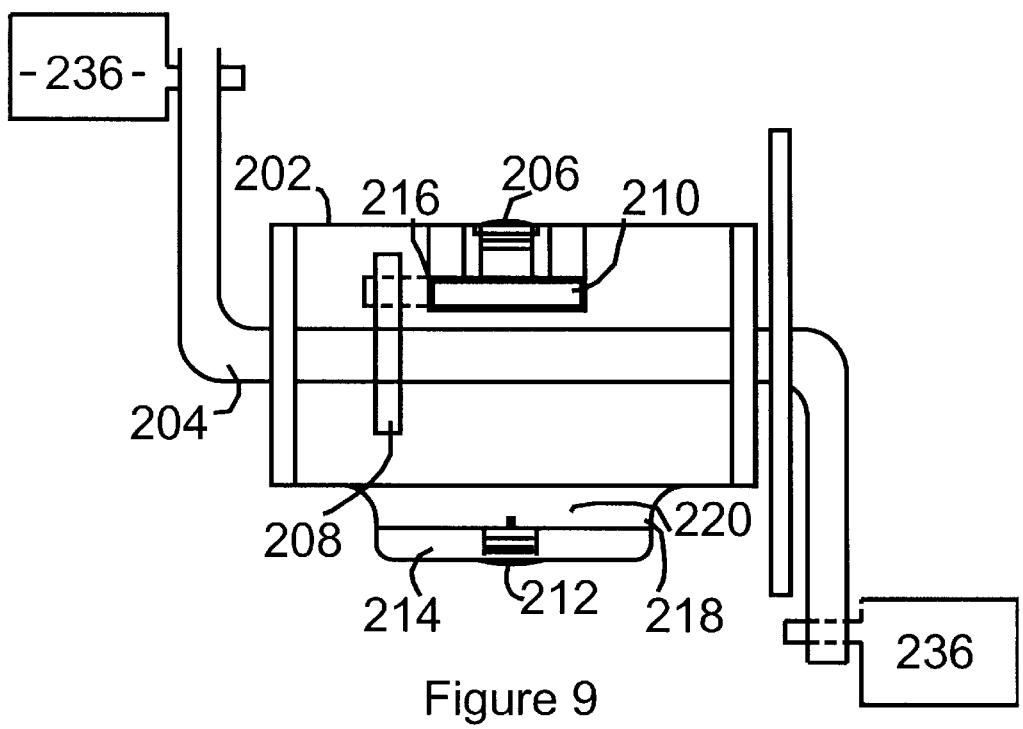
FIG. 9 is a cutaway rear view of the mechanically activated bicycle locking device.
Figure 10:
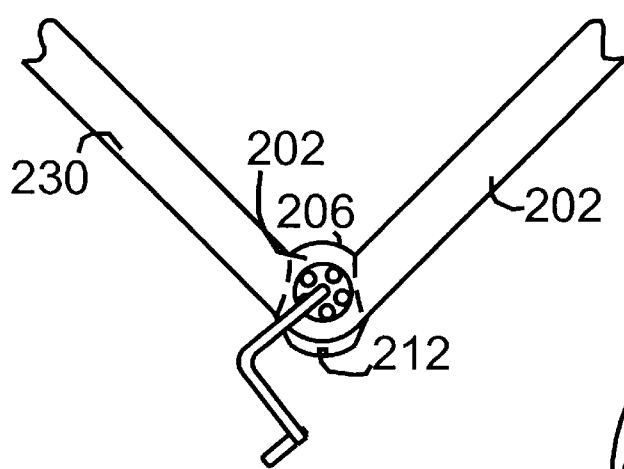
FIG. 10 is a side view of the bicycle locking device of FIG. 9 mounted in a bicycle.
Figure 11:
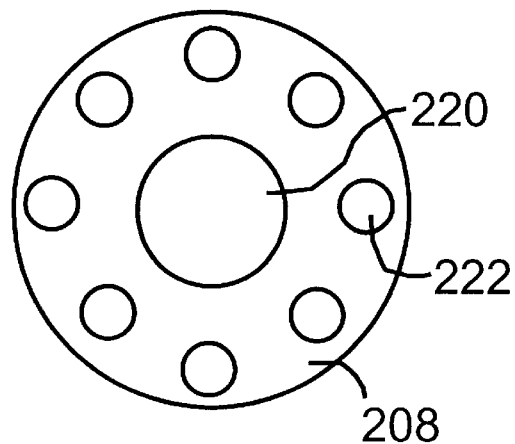
FIG. 11 is a top view of the engagement disk for use with the bicycle locking device.

FIGS. 9, 10 and 11 illustrate a manual version of the locking device 200 for use with wheeled vehicles and is illustrated on a bicycle. The locking mechanisms within the locking device are located within a protective case 202 to prevent tampering. The case 202 is welded to the front frame 230 and rear frame 232 as currently done in the art replacing the standard joint at the juncture of the front and rear supports. The case 202 is slightly larger than standard cases to accommodate the locking device 200. The pedal axle 204 passes through the case 202 and is attached to the pedals 236 as known in the art. The engagement disk 208 has a centered receiving hole 220 that permits the disk 208 to be mounted on the axle 204. The disk 208 is welded to the axle 204 to cause the disk 208 to rotate with the axle 204 as the bicycle is pedaled. The disk 208 contains a series of receiving holes 222 around its periphery. The receiving holes 222 are dimensioned to receive the locking bar 210 that has been encased in the locking brace 216. The locking brace 216 is secured to the case 202 to prevent movement of the bar 210 and therefore movement of the pedals 236 once the bar 210 is in the locked position. When in the unlocked position, the locking bar 210 is drawn into the locking brace 216. Once placed into the locked position, the bar 210 engages the receiving holes 222 of the disk 208 and prevents the pedals 236 from turning. The locking brace 216 must be securely affixed to the case 202 to prevent the brace 216 from dislodging when a user attempts to pedal during the locked mode. Additionally, the locking bar 210 must have sufficient strength to prevent the bar 210 from snapping or bending. In the embodiment of FIG. 9 the bar 210 is placed into either the locked or unlocked position by a key lock 206, or other mechanically operated device. The interior mechanisms moving the locking bar 210 in response to the key lock 206 are like those of dead bolts for doors and other methods will be known to those skilled in the art.

To provide the ability to repair the locking device in the event a problem arises; a bottom plate 214 is incorporated into the locking device 200. The bottom plate 214 illustrated has a rotating lock 212 that is secured to a locking plate 220. The flanges 218 extend into the open area of the case 202 and provide support for the locking plate 220 when rotated to the locked position. Rotation of the rotating lock 212 moves the locking plate 220 into a position to clear the flanges, thereby permitting removal of the bottom plate 214. The locking mechanism for the bottom plate is an example of a method for locking the bottom plate onto the case and other methods known in the art can be used.

Figure 13:
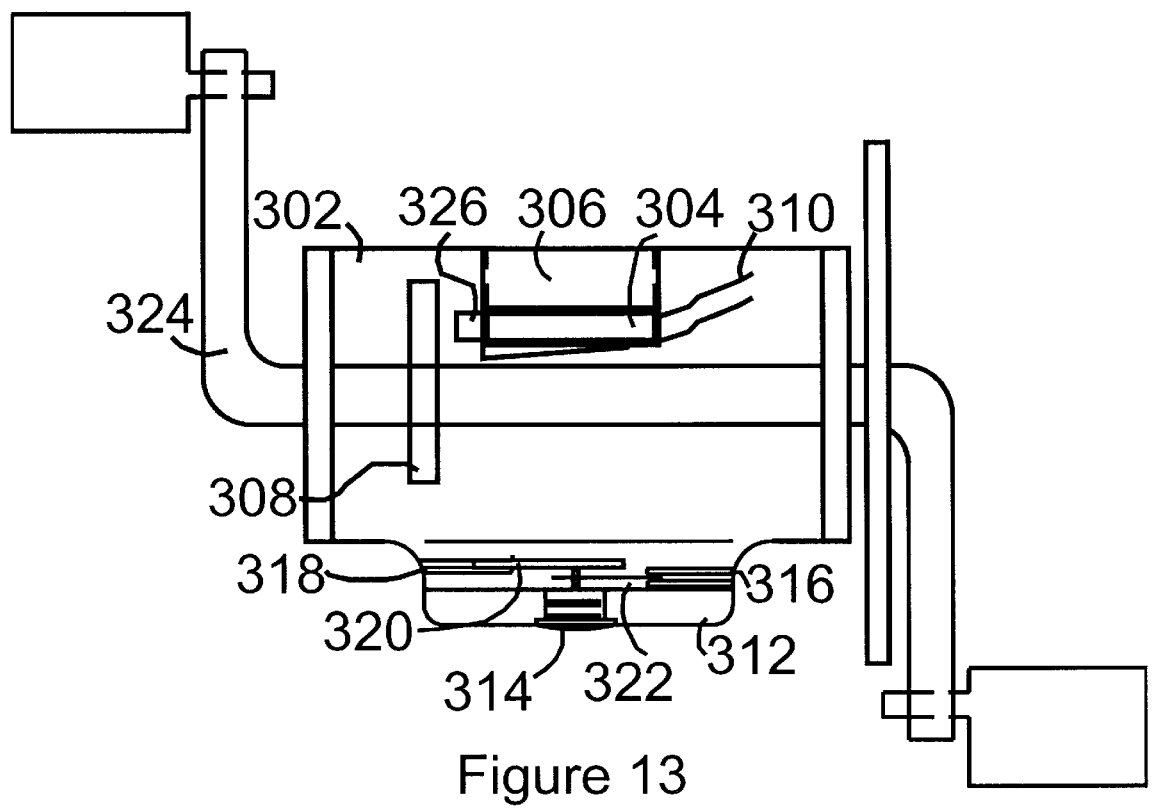
FIG. 13 is a cutaway view of the solenoid activated bicycle locking device mounted on a bicycle.
Figure 12:
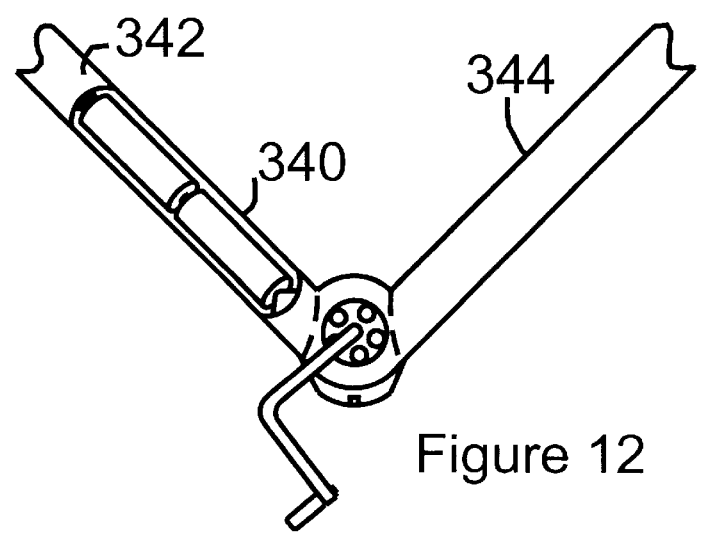
FIG. 12 is a side view of the bicycle locking device of FIG. 11 mounted in a bicycle.
Figure 14:
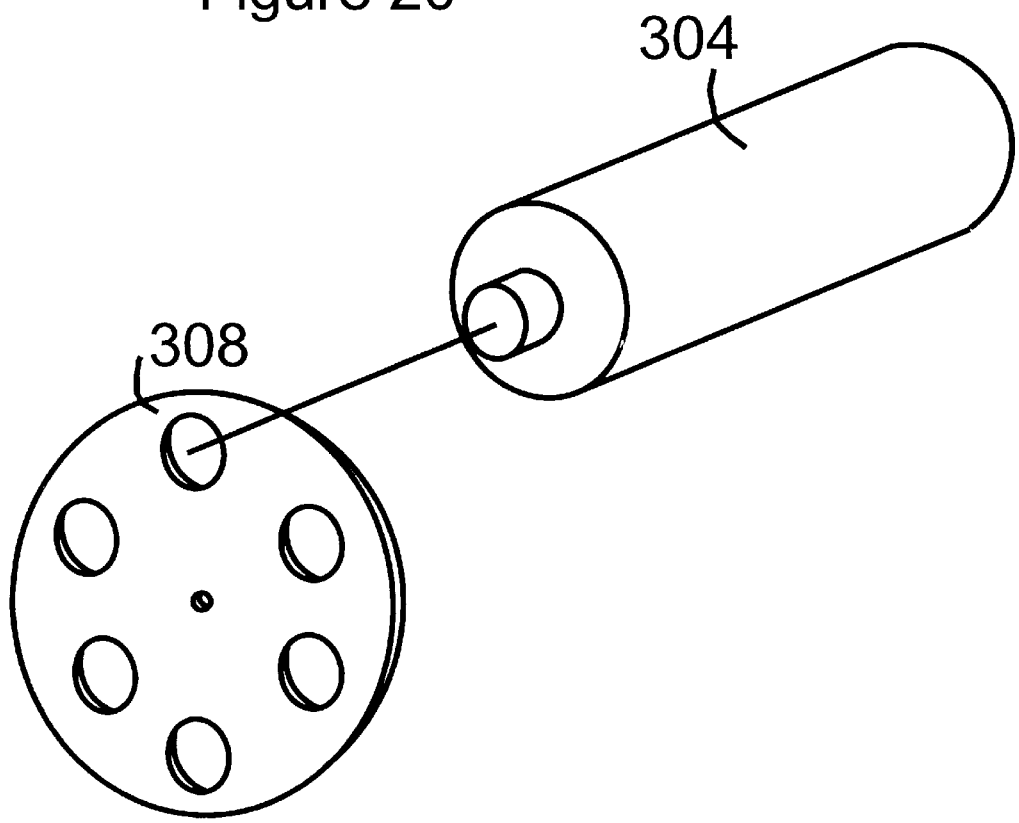
FIG. 14 is an exploded view of the engagement disk and latching solenoid.

An automatic embodiment of the locking mechanism for use with bicycles is illustrated in FIGS. 12–14. The engagement disk 308 is welded to the pedal axle 324 as described heretofore. Rather than the manual lock of FIG. 9, the interacting locking bar 326 is operated by a battery-powered solenoid 304. The solenoid 304 is maintained in position through use of a casing 306 that is securely affixed to the outer case 302. As stated heretofore, the locking bar 326 must be capable of withstanding the pressure exerted by a person attempting to pedal the bike. The batteries 340 to power the solenoid 304 can be contained within the front support 342 or other location convenient for manufacture. The use of a battery-powered solenoid also permits the use of a timer as disclosed for use with the hand tool of FIG. 1. The analogue timer is advantageous for companies renting bikes by the hour or day as the timer can be activated upon the bike being removed from the shop and the time read and calculated upon return. The timer readout, entry method, etc., can be incorporated in either the front support 342 or back support 344.

The base plate 312 uses an alternate design to the embodiment of FIG. 9. In this embodiment, the base plate 312 is provided with a key lock 314 that is attached to dual rotating bars 320 and 322. The sides of the case 302 are provided with flange pairs 318 and 316 that are dimensioned to interact with the rotating bars 320 and 322. Thus, as the key lock 314 is turned, the bars 320 and 322 move out of their interaction with the flange pairs 318 and 316, thereby releasing the base plate 312.

The disclosed device is applicable for use with any gas powered vehicles, from heavy equipment, such as fork lifts, bull dosers, automobiles or boats. The locking device is not compatible with the electronic starter system of the newer equipment and is too easily by-passed. The device is, instead, placed along the fuel line cutting off the supply of fuel to the engine or, alternatively, placed on the exterior or in the casing of the fuel pump. The fuel pump and/or line is not readily accessible, thereby preventing the locking device from being either removed or "hot wired". Due to safety concerns, the timed shutoff feature would not be included on all vehicle applications, such as automobiles or boats, however in some instances, such as boat rentals, the time-lapsed feature would be beneficial.

Figure 18:
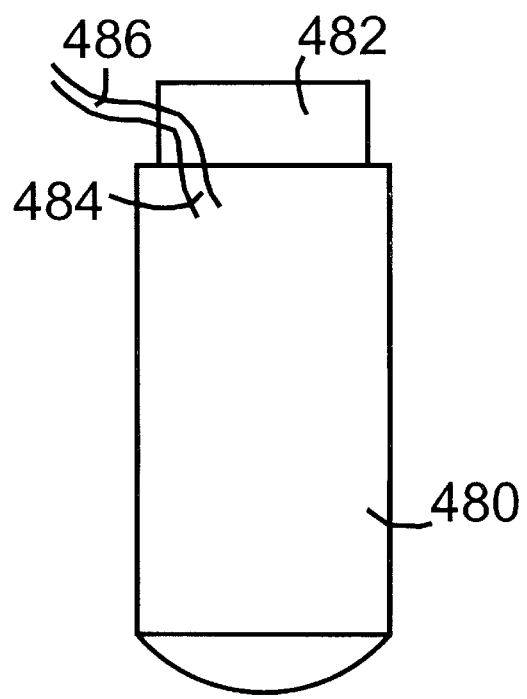
FIG. 18 is a side view of a fuel pump containing the solenoid switch.

The disclosed security device 482 is illustrated in FIG. 18 in conjunction with a fuel pump 480. The security device 482 is activated, or deactivated, by touch key, infra red, manual key, etc. The exact activation/deactivation method would be dependent upon the type of vehicle, end use and cost considerations. For a new personal automobile, the security device 482 could be activated/deactivated as part of the infra red door lock system. Therefore, when the doors are locked, using the remote infra red pad, the security device 482 would shut off power to the fuel pump 480. When the doors are unlocked, the power would be restored to the fuel pump 480. Alternatively, a touch key can be used to activate/deactivate the security device 482. The receiving portion of the touch key can be placed within the car and the transmitting portion affixed to a key ring. Thus, the user would deactivate the security device 482 upon leaving the car and reactivate the power to the fuel pump 480 upon returning. The ability of the touch keys to be programmed would allow only certain users to activate the device 482.

Figure 5:
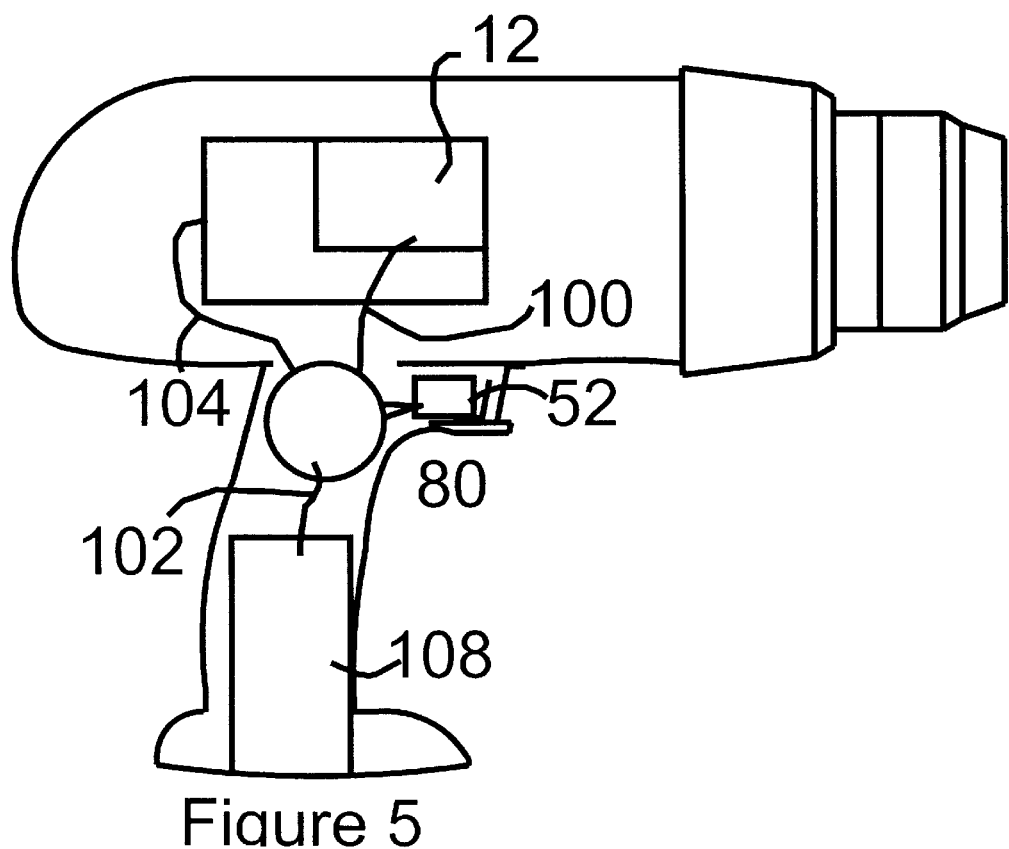
FIG. 5 is a cutaway side view of the interior of the hand tool of FIG. 1.

The security device 482 uses the sample electronics as illustrated in FIG. 4, although other methods will be obvious to those skilled in the art. The power leads 486 are placed directly into the security device 482. Power is then directed from the security device 482 to the fuel pump 480 through leads 484. Preferably the security device 482 and fuel pump 480 are encased as one unit to avoid overriding the security system.

Figure 19:
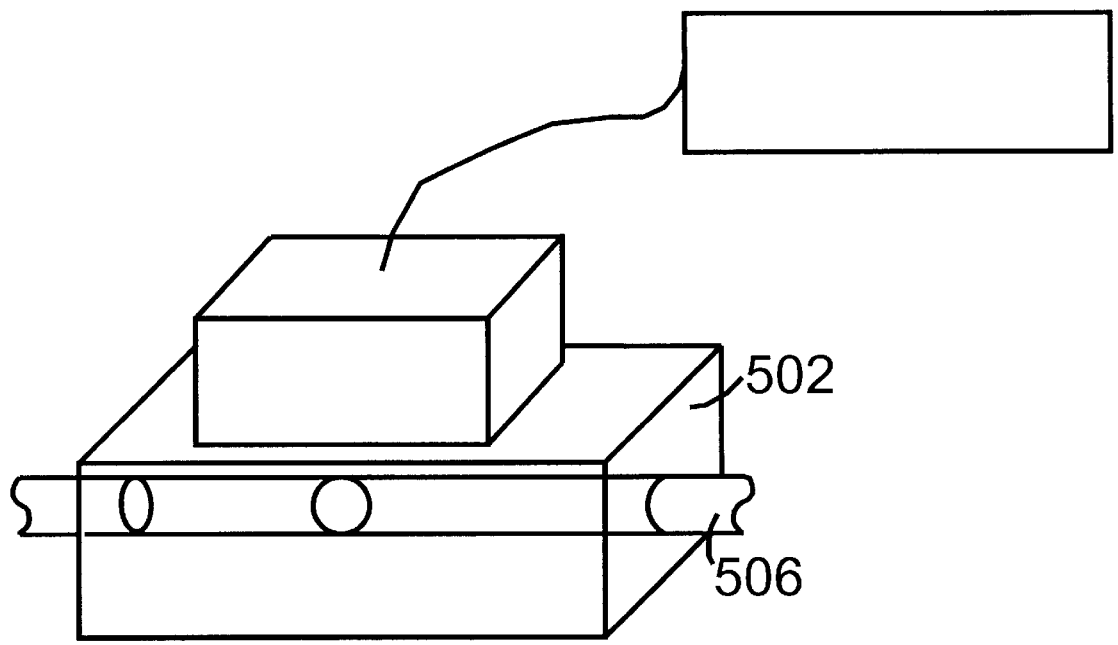
FIG. 19 is a perspective view of the control box and shut off valve placed along the fuel line.

In FIG. 19 fuel line shutoff system 500, control box 504, is in physical proximity to the shut off valve 502. The shut off valve 502 is preferably an explosion proof solenoid valve, such as manufactured by Asco and identified as EF8262/8263. These, or alternate valves meeting the safety criteria and having the ability to block fuel flow, are mounted directly onto the fuel line 506 to control the fuel flow to the engine. The control box 504 provides the electronics to direct the valve 502 to open or close the fuel line 506. The control box 504 can receive signals to activate or deactivate fuel flow through any of the disclosed methods as well as those known in the art.

Figure 20:
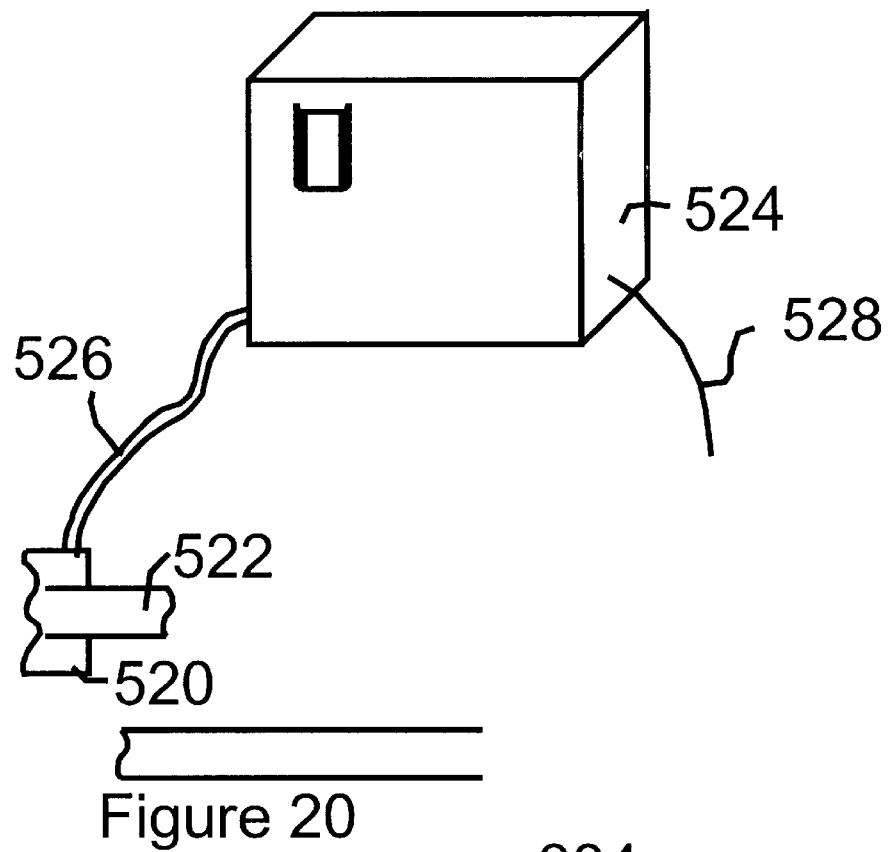
FIG. 20 is a perspective view of the control box and shut off valve mounted separately.

In FIG. 20 the control box 524 is separated from the shutoff valve 520. The valve 520 is mounted directly on the fuel line 522 and meets the criteria disclosed in FIG. 19. The control box 524 is connected to the valve 520 through use of power leads 526, thereby permitting the control box 524 to be spaced a desired distance from the valve 520. The control box 524 receives power from the battery, or independent power source, through the power lead 528.

Any of the foregoing embodiments can be connected to an indicator light within the vehicle to notify the user that the fuel line is either activated or deactivated. Additionally, the disclosed fuel shut off devices can be retrofitted onto the gas vehicle by a mechanic. In the event that infra red activation/ deactivation is desired, a sensor and corresponding pad can be easily installed in the vehicle. The solenoid can also be incorporated with the timing device to block the fuel supply on a timed basis, however, user safety must be considered prior to shutting down the fuel supply to a moving vehicle. The timer can be used to prevent a gas powered vehicle from being used during a certain period.

The locking device disclosed herein, whether used on hand tools or heavy equipment, can be used in either a timer mode and/or a security device. In instances where the time used is not an issue and the owner is merely looking to prevent theft of the equipment, the device serves as a security measure.

Since other modifications and changes varied to fit particular operating requirements and environments will be apparent to those skilled in the art, the invention is not considered limited to the example chosen for the purposes of disclosure, and covers all changes and modifications that do not constitute departures from the true spirit and scope of this invention.

What is claimed is:

1. An operating control device for equipment having an exterior case, a power source, an internal activation member and a driver member, said control device having:
   a predetermined user access code,
   a user determined programmable activation time period, said programmable activation time period being entered subsequent to entry of said access code,
   an input device, said input device being integral with said exterior case for entry of said predetermined user access code and said programmable activation time period;
   a readout panel, said readout panel being visible at said exterior case and providing a status of said operating control device;
   an internal control member, said control member being in direct communication with said input device, said power source, said driver member and said activation member,
   wherein said internal control member prevents operation of said equipment by preventing power to transfer from said power source to said driver member without entry of said predetermined user code, entry of said user code enabling power to transfer from said power source to said activation member to said driver member to permit both continuous and intermittent operation of said equipment during said programmable activation time period and prevent operation of said equipment upon expiration of said programmable activation time period.

2. The operating control device of claim 1 further comprising a clock member, said clock member activating and deactivating said timer based on user input.

3. The operating control device of claim 1 wherein said communication is by electrical wires.

4. The operating control device of claim 1 wherein said control member and said wires are encased in a solid material, thereby making said control member and said wires inaccessible.

5. The operating control device of claim 1 wherein said equipment is a hand tool.

6. The operating control device of claim 1 wherein said equipment is electronic.

7. The operating control device of claim 1 wherein said equipment is a camera.

8. The operating control device of claim 1 further comprising an a locking device for said exterior case, said locking device preventing nonuser access to said control device.

9. The operating control device of claim 1 further comprising a solenoid, said solenoid connecting said activation member to said power source.

10. An operating control device for at least one piece of equipment, said equipment having an exterior case, a power source, an internal activation member and a drive member, said control device having:
   an input device, said input device being integral with said exterior case and permitting input of a user access code;
   a readout panel, said readout panel being visible at said exterior case and providing a status of said operating control device;
   an internal control member, said control member being in direct communication with said input device, said power source, said driver member and said activation member,
   a user programmable timer, said user programmable timer communicating with said control member and enabling power to flow from said power source to said driver member for a user determined period of time, said user determined period of time being enterable by said user at said input device subsequent to entry of said user code;
   a clock member, said clock member activating and deactivating said programmable timer based on user input;

wherein said internal control member prevents operation of said equipment by preventing power to transfer from said power source to said driver member without entry of said user code, and entry of said user code permits power to transfer from said power source to said activation member to said driver member to permit both continuous and intermittant operation of said equipment for the duration of said user determined period of time, said user determined period of time being monitored by said programmable timer.

11. The device of claim 1 wherein said input device is activated by a self contained, portable remote unit, said portable remote unit containing an activation code, said activation code activating programming within said control member.

12. The device of claim 11 wherein said portable remote unit is a scanning touch key.

* * * * *